(12) United States Patent
Hughes

(10) Patent No.: US 11,732,929 B2
(45) Date of Patent: Aug. 22, 2023

(54) OPTIMIZED CO2 SEQUESTRATION AND ENHANCED GEOTHERMAL SYSTEM

(71) Applicant: William James Hughes, Highlands Ranch, CO (US)

(72) Inventor: William James Hughes, Highlands Ranch, CO (US)

( * ) Notice: Subject to any disclaimer, the term of this patent is extended or adjusted under 35 U.S.C. 154(b) by 0 days.

(21) Appl. No.: 17/588,267

(22) Filed: Jan. 29, 2022

(65) Prior Publication Data
US 2023/0114197 A1   Apr. 13, 2023

Related U.S. Application Data

(60) Provisional application No. 63/255,325, filed on Oct. 13, 2021.

(51) Int. Cl.
*F24T 10/40* (2018.01)
*E21B 41/00* (2006.01)
(Continued)

(52) U.S. Cl.
CPC .............. *F24T 10/40* (2018.05); *E21B 10/00* (2013.01); *E21B 41/0064* (2013.01); *E21B 43/124* (2013.01); *F24T 2010/53* (2018.05)

(58) Field of Classification Search
CPC ....... F24T 10/40; F24T 2010/53; F24T 10/17; F24T 10/20; F24T 2010/50; F24T 10/00;
(Continued)

(56) References Cited

U.S. PATENT DOCUMENTS 4,220,202 A * 9/1980 Aladiev ................. E21B 43/24
166/57
5,209,297 A * 5/1993 Ott .......................... C09K 8/16
507/140
(Continued)

FOREIGN PATENT DOCUMENTS

CN      104329027 A * 2/2015 ............ E21B 10/60
DE      19919555 C1 * 6/2000 ........... E21B 17/203
(Continued)

OTHER PUBLICATIONS

Liu et al. "CO2 injection to granite and sandstone in experimental rockhot water systems" Energy Conversion and Mangement, 44, 1399-1410 (Year: 2002).*
(Continued)

*Primary Examiner* — Harry E Arant
(74) *Attorney, Agent, or Firm* — Michael D. Reilly

(57) ABSTRACT

Disclosed herein are various embodiments of systems for drilling and operating a well which may have dual uses. The well may be drilled and operated as a geothermal well using a hybrid approach where a heat transfer fluid is injected into a hot rock formation but is not removed, and heat is extracted using a closed loop method. The geothermal well is then evaluated for use as a carbon dioxide sequestration well. In other embodiments, the well is drilled as a carbon dioxide sequestration well and then evaluated for its potential for generating geothermal energy using a hybrid approach where supercritical carbon dioxide is injected into a hot rock formation but is not removed, and heat is extracted using a closed loop method. Both horizontal and vertical wells are disclosed, in sedimentary rocks and in basement granite.

18 Claims, 10 Drawing Sheets

(51) Int. Cl.
  *E21B 10/00* (2006.01)
  *E21B 43/12* (2006.01)
  *F24T 10/00* (2018.01)

(58) Field of Classification Search
  CPC ........ F24T 1/10; E21B 10/00; E21B 41/0064;
    E21B 43/124; F22B 1/16
  See application file for complete search history.

(56) References Cited

U.S. PATENT DOCUMENTS

| | | | |
|---|---|---|---|
| 6,668,554 B1 * | 12/2003 | Brown | E21B 41/0064 60/641.2 |
| 8,316,995 B2 | 11/2012 | Saar et al. | |
| 11,168,526 B1 | 11/2021 | Hughes | |
| 2006/0101820 A1 * | 5/2006 | Koenig | F24T 10/00 60/641.2 |
| 2010/0326729 A1 * | 12/2010 | Marvel | E21B 7/20 175/57 |
| 2021/0048229 A1 * | 2/2021 | Niemi | F24D 5/12 |
| 2021/0172273 A1 | 6/2021 | Hughes | |

FOREIGN PATENT DOCUMENTS

| | | | | |
|---|---|---|---|---|
| DE | 102010033519 A1 | * | 2/2012 | ......... E21B 17/1028 |
| FR | 3091895 A1 | * | 7/2020 | ............. F01K 25/10 |
| KR | 101368197 B1 | * | 2/2014 | |
| WO | WO 2021/119995 A1 | | 6/2021 | |

OTHER PUBLICATIONS

CO2 injection to granite and sandstone in experimental rock/hot water systems by Lihui Liu et al., Pergamon, Energy Conversion and Management 44 (2003) 1399-1410.

"Enhancement of Permeability Activated by Supercritical Fluid Flow through Granite" by Tsuyoshi Nohara et al., Wiley, Geofluids, vol. 2019, Article ID 6053815, https://doi.org/10.1155/2019/6053815.

"A Novel Approach for Downhole Power Generation in Geothermal Wells Using Thermoelectric Generator" by Jainish Shingala, Manan Shah, Proceedings, 45th Workshop on Geothermal Reservoir Engineering, Stanford University, Stanford, California, Feb. 10-12, 2020 SGP-TR-216.

* cited by examiner

OPTIMIZED CO2 SEQUESTRATION AND ENHANCED GEOTHERMAL SYSTEM

CROSS REFERENCE TO RELATED APPLICATIONS

This application claims the benefit of U.S. Provisional Patent Application No. 63/255,325, entitled "Optimized CO2 Sequestration and Enhanced Geothermal System" inventor William James Hughes, applicant Hughes Tool Company LLC, filed on Oct. 13, 2021, which is hereby incorporated by reference in its entirety.

This application is related to U.S. Utility patent application Ser. No. 17/113,005 entitled "Annular Pressure Cap Drilling Method", inventor William James Hughes, applicant Hughes Tool Company LLC, filed on Dec. 5, 2020. Utility patent application Ser. No. 17/113,005 was published as U.S. Utility Patent Application Publication No. US 2021/0172273 on Jun. 10, 2021 and issued as U.S. Pat. No. 11,255,144 on Feb. 22, 2022 which is hereby incorporated by reference in its entirety. A continuation was filed as U.S. patent application Ser. No. 17/556,825, which issued as U.S. Pat. No. 11,377,919 on Jul. 5, 2022, which is hereby incorporated by reference in its entirety.

This application is related to PCT International Patent Application No. PCT/US2020/063522 entitled "Annular Pressure Cap Drilling Method", inventor William James Hughes, applicant Hughes Tool Company LLC, filed on Dec. 6, 2020, and published as PCT International Application Publication No. WO 2021/119995, the latter of which is hereby incorporated by reference in its entirety.

FIELD

Various embodiments described herein relate to drilling wells for carbon dioxide sequestration and geothermal energy generation, and devices, systems and methods associated therewith.

Background—Geothermal Energy

Geothermal energy, that is, energy generated in the form of heat within the Earth, has been known and used for centuries. In many places around the world, this energy reaches the surface in the form of geysers, hot springs and natural steam vents. Water percolates through the earth until it reaches hot rocks, where it becomes superheated and turns to steam. The superheated water and steam then find their way to the surface through natural faults and fissures. The best known examples occur in areas such as Iceland, the Napa Valley, and other areas where there is hot rock close to the surface, or large areas of superheated rock, known as hot spots, deep under the earth's surface. The best known of these, at least in the United States, is the Yellowstone Hot Spot.

In recent years, geothermal energy has been used for small scale projects such as heating individual homes, and for commercial scale projects to heat entire housing developments or industrial buildings. These projects involve relatively shallow heat sources, and rely on the fact that the Earth, some few feet below the surface, maintains a relatively constant temperature. Larger scale projects can tap the heat of the earth in much deeper layers, at depths of thousands of feet. The heat in the deeper layers is transferred to the surface by heating injected water and using the water, in the form of steam, to drive turbines and generators for the generation of electric power. At such depths, the temperatures of the rocks are in the hundreds of degrees.

Geothermal energy gained more attention as the price of fossil fuels increased, together with the predictions that reserves of fossil fuels were being rapidly depleted and would soon be exhausted. Recent developments in the production of oil and gas, especially the ability to recover reserves in tight formations through hydraulic fracturing, have reduced the sense of urgency. These new technologies in reality are just postponing the inevitable. At some point in the future, the recoverable reserves of hydrocarbons will have been consumed. It therefore makes sense to begin to convert to geothermal energy at this time, rather than wait for the hydrocarbon reserves to decline.

An added incentive to look at geothermal energy has been provided by the problems associated with global warming, to which fossil fuels are a major contributor. Enhanced recovery through hydraulic fracturing ("fracing") and other techniques helps to mitigate the problem in the short term, replacing coal fired power stations with gas burning power stations. However, it is quite possible that this coal will be burned somewhere, and some people predict that coal may become the world's number one fossil fuel, replacing oil, within a few years because of the continuing expansion of coal fired power plants in China and India. Anything that can be done to offset the associated increase in emissions will help. Geothermal energy production does not add significant quantities of greenhouse gases to the atmosphere. The electricity generated from geothermal energy can replace the energy generated by coal fired power plants, thus reducing emissions and slowing global warming.

While fracing has made it possible to extract previously unrecoverable reserves of hydrocarbons, the fracing techniques currently in use require large quantities of water. Obtaining rights to the water can be a problem in many areas, especially the Western United States where water has long been a contentious issue. There is also the problem of what to do with the water once the fracing procedure is complete and the water is pumped back out from the well. There are environmental concerns over the impact of fracing on water supplies. Geothermal energy production can, in some embodiments, including those described herein, be achieved without the use of large quantities of water.

Other patents and patent applications by the inventor of the technologies described herein, in U.S. Utility Patent Application Publication US 2021/0172273 entitled "Annular Pressure Cap Drilling Method", inventor William James Hughes, applicant Hughes Tool Company LLC, hereinafter "the '273 Publication", show how it is possible to produce oil and gas without hydraulic fracturing and without the need for large quantities of water and chemical additives. Additional benefits of these techniques include better production and better depletion curves, combined with significantly lower overall costs. These techniques are also part of the near-term solution as the world shifts to renewable energy sources. However, the drilling technique disclosed in those patents and patent applications, specifically the philosophy of not causing damage to the wellbore by employing near-balanced drilling methods, is also applicable to the drilling of wells for geothermal energy projects.

Electricity generated by geothermal sources has an additional benefit when compared to other sources of renewable energy such as solar energy or wind energy in that it can provide a reliable supply of energy at any time of day or night and is not dependent on weather conditions. The amount of energy produced can be controlled and varied, making geothermal energy production a possible backup for other less consistent forms of energy, or where demand varies by the season or the time of day. In areas such as the western United States, where there are large expanses of hot rocks at relatively shallow depths, the potential for developing geothermal energy is enormous. Globally, there are few areas where geothermal energy could not be developed, given the right methods and expertise.

The heat extracted from the hot rocks by geothermal energy production is replaced by heat created by the decaying of radioactive elements in the Earth's crust, and by primordial heat flowing from the deeper layers of the Earth. Thus energy produced by geothermal techniques, whether directly in the form of heat or indirectly as electricity, truly is a renewable resource. This means that geothermal energy projects may be eligible for subsidies and tax breaks, and will appeal to states and other organizations which have goals for making renewable energy a certain percentage of the total energy they consume.

Another advantage of geothermal energy production is that the amount of land dedicated to the production of energy is considerably less than other methods of energy production. The generating equipment, pumps etc., take up relatively little space. Most of the hardware is underground, and it could be underneath an urban or suburban area as easily as under an expanse of farmland or forest. This contrasts with solar energy farms and wind farms, both of which require large areas of land to be dedicated to energy production. Further, the visual impact of geothermal energy production is minimal. Solar energy farms have drawn some protests, and wind farms with their arrays of huge turbines are considered by many to be a visual blight on the landscape, and a threat to birds. As a result, wind and solar farms are often located in remote areas, far from where the electricity is used. This adds to the expense of power generation and transmission, and requires miles of power lines which many also regard as visual pollution.

In some geothermal areas, water in the form of steam or superheated water emerges naturally from fractures, forming geysers and hot springs. Such heat sources are often intermittent, and may be unreliable and inconsistent. Early geothermal projects drilled into aquifers of heated water to extract the energy. Many of these projects now produce much less than their peak energy. In some cases, the heat flow is insufficient to replenish the heat extracted, or the heated water in the aquifer is being depleted. In either case, it is clear that pumping water from an aquifer is not sustainable in the long term.

It may be appropriate to describe the use of these natural sources of hot water as "passive" geothermal, in that all is required is to tap into the heat brought to the surface by natural water flows. In the search for geothermal energy in places which are not so fortunate, various ways have been devised to extract the heat from deep underground and bring it to the surface. These techniques usually involve pumping a heat transfer fluid into a hot rock formation, and pumping the fluid out after it has absorbed the subsurface heat. Therefore it takes energy to produce energy. We may characterize these techniques as "active" geothermal energy.

Modern active geothermal energy projects can be divided into two groups. The first group includes methods where a fluid, usually water, is pumped down injection wells into hot rock formations, allowed to migrate through the hot rock, collecting heat as is does so. Then the fluid is captured by extraction wells, located some distance vertically above the injection wells, and pumped back to the surface where the heat used directly or converted to electricity. The wells are usually now drilled horizontally, to maximize the volume of hot rock exposed to the fluid, and to take advantage of the natural fractures in the Earth, which generally will be predominantly vertical. The hope is that the heated fluid will migrate upwards relying on convection to transfer the heat upwards. In practice, the fluid will disperse throughout the natural fracture system, and only a small part of it may reach the extraction well.

This is sometimes referred to as the "plume" approach. It requires substantial quantities of fluid, and much of the injected fluid is not recovered because of the dispersion throughout the rock matrix. Just like rising smoke on a hot day, the plume becomes broader as it rises. So while it may seem logical to increase the amount of heat captured by increasing the vertical distance between the injection and extraction wells, the greater the vertical distance, the more the dispersion of the plume, and therefore less fluid reaches the extraction well.

There have been suggestions that carbon dioxide ($CO_2$) could be used as the injected fluid, which does have some advantages. The thermal characteristics of the $CO_2$ are superior to those of water, and it is actually a benefit that the fluid remains in the rock formation—this is a form of carbon sequestration.

In order to produce better fluid flow from the injection well to the extraction well, in some geothermal operations, the rocks between the wells are subjected to hydraulic fracturing to enhance the natural fracture system and increase the flow rate between the injection and extraction wells. This technique is referred to as "enhanced" geothermal energy generation. As with hydraulic fracturing for oil and gas production, it is often used after the natural fracture system has been damaging while drilling the well using conventional overbalanced drilling techniques. There is also some doubt as to whether the hydraulic fracturing process enhances the natural fracture system or just pushes the heavy drilling mud further into the fractures, actually reducing the overall permeability.

Although the use of hydraulic fracturing for geothermal wells does not release methane as might happen when drilling for hydrocarbons, it still requires large amounts of water, often laced with chemicals to improve the results of the hydraulic fracturing operation. This is a serious drawback, especially in areas such as the Southwestern United States where hot rock formations are accessible, but water is a scarce and much fought-over resource, Geothermal energy generation has been implicated in adverse impacts on the stability of the land. For example, subsidence has occurred in the Wairakei field in New Zealand. In some seismically active areas, injecting large volumes of water may cause earthquakes, as the injected water lubricates the existing faults and allows the fault planes to slip. A geothermal project in Basel, Switzerland, was suspended after more than 10,000 seismic events, some as high as 3.4 on the Richter scale, were observed during the first six days of drilling.

Where hydraulic fracturing is used to enhance the flow of heated water, this effect may be exacerbated. For these reasons, many localities have included hydraulic fracturing for geothermal wells in an overall "fracking ban". In areas where there is opposition to hydraulic fracturing, it is virtually impossible to persuade the community than some types of "fracking" are not as bad as other types. These bans make development of geothermal resources problematic, and are often imposed in more densely populated areas which are most in need of clean energy resources.

Water pumped from deep rock formations may contain various dissolved gases, including carbon dioxide, hydrogen sulfide, methane and ammonia. Carbon dioxide and methane are well known greenhouse gases. Geothermal energy does produce far less carbon dioxide than the use of fossil fuels but the problem cannot be ignored. Hydrogen sulfide and ammonia are dangerous in anything other than trace amounts. These gases also contribute to the formation of acid rain. Geothermal plants using the inject and recover approach therefore must be equipped with emission control systems, and in some cases should install carbon sequestration systems to reduce the amount of carbon dioxide introduced into the atmosphere.

The heated water pumped up from deep in the earth may contain large amounts of dissolved minerals which can damage the turbines and electrical generating equipment. Some of these substances contain mercury, arsenic, boron, antimony, and salt (sodium chloride). As the water cools, these substances drop out of solution. They must be dealt with in a responsible way in order to prevent damage to the environment. This is often done by re-injecting these substances into the earth along with the water being injected for the geothermal process.

The second approach to active geothermal energy production uses water or other fluids pumped through pipes within the hot rock formations. These are known as closed-loop systems, in that all the fluid pumped into a well is contained within the underground pipes and is recovered and reused. Such methods have their own set of problems, one of which is the formation of air pockets, or the conversion of water to steam at an earlier point in the pipe system than is optimal. These vapor pockets block the flow of the water and may greatly reduce the efficiency of the geothermal heat transfer process.

The closed loop approach has two variations. One uses a single well and concentric pipes to send a heat transfer fluid down a vertical wellbore and then along a directional wellbore. At the end of the wellbore the heat transfer fluid U-turns and flows back along the wellbore within a concentric pipe. The advantage of this approach is that it requires only one surface site and only one wellbore.

The second variation of the closed loop approach also uses pipes to send a heat transfer fluid down a vertical wellbore and then along a directional wellbore, but the heat transfer fluid is conveyed back to the surface up a second vertical wellbore. When it reaches the surface, the fluid is then pumped back to the injection wellbore through a surface or shallow pipeline. The heat extraction would normally happen as the fluid reaches the surface. Of course, this method requires two surface locations, and introduces permitting issues for the return pipeline.

The closed loop approach does eliminate issues with induced seismicity and with contamination of the extracted fluids. However, it does have two major weaknesses. The surface area of the pipe in contact with the hot rock is relatively small, and the heat from the rock surrounding the pipe is rapidly depleted. In other words, heat is removed from the rock surrounding the pipe and transferred to the surface faster than the heat is replenished by heat flowing in from the surround rock. Operators have addressed the first problem by drilling longer wellbores and installing longer pipes. The second problem remains more intractable. One solution is to drill a series of wellbores radiating outwards from the same surface location, then use each well in sequence for a fixed period of time, such that one well is generating geothermal energy while the other wells are recovering. This works with the single vertical well approach, but introduces more problems with the two-vertical-well approach. Of course, this adds considerably to the cost and complexity of the installation, changing the economics of the project. Other proposed solutions are even more complicated, such as a parallel two well system with opposing directions of flow, with heat exchange facilities at both surface locations.

Background—Carbon Sequestration

The second component of the present invention concerns carbon sequestration, that is, the process of permanently storing carbon dioxide in a geologic formation so that it is removed from the atmosphere and does not contribute to global warming. It is generally agreed by scientists, with growing acceptance from the public, that it is not enough to convert energy use to renewables. The planet has reached a point where in order to avoid catastrophe, the warming process must be reversed, and carbon dioxide removed from the atmosphere in enormous quantities.

The present specification does not cover the technology used to capture the carbon dioxide. There is an abundance of information readily available on this topic, with new approaches being developed on an ongoing basis. For the purpose of this specification, it is sufficient to note that there are two main sources of carbon dioxide for sequestration.

The first source is the capture of carbon dioxide at the point of generation. This includes the obvious, such as fossil fuel burning powerplants, cement plants and steel mills. It may also include some smaller generators of carbon dioxide, such as breweries and *cannabis* grow operations. Ideally, the carbon dioxide would be sequestered at the point of generation, but presently much of the captured gas is sent via dedicated pipelines to sequestration facilities. Lack of on-site sequestration capability and limitations on the availability of pipelines imposes serious limitations of the amount of carbon dioxide which is currently captured and sequestered.

The second source is what is known as Direct Air Capture, which involves extracting carbon dioxide from the atmosphere. This is often accomplished by passing large volumes of air through machines resembling large air conditioners. Of course, these machines require some form of energy to drive them, which in some cases is natural gas, or electricity generated from natural gas. The first step, naturally, is to capture the carbon dioxide emitted while creating that energy.

Once the carbon dioxide has been captured, it can then be pumped underground into rock formations for permanent storage. This process is known as "carbon sequestration". It must be noted that the goal of sequestration is permanent disposal of the carbon dioxide. It is not quite the same thing as the injection of carbon dioxide into oil and gas wells for secondary and tertiary recovery of yet more hydrocarbons, a process which has a long and successful track record. Some operators do indeed pump more carbon dioxide into the ground than is necessary for hydrocarbon recovery, and this can be counted as a form of sequestration.

Because initial attempts at sequestration frequently used available oil and gas wells which had reached the end of their productive life, it is often assumed that this is the best, or even the only, approach. However, using drilling techniques described in the referenced patent applications, wells can be drilled efficiently and cost-effectively just for the purpose of carbon sequestration. Thus there is no need for pipelines to transport the carbon dioxide from the point of generation to the place of disposal. For example, a cement plant, or a powerplant not located close to an oil or gas field, could have its own dedicated carbon sequestration wells.

Conversely, an oil or gas field which happens to be located miles from any convenient transport method, such as a pipeline or terminal, could be developed for the purpose of generating energy to run carbon capture machinery, and the carbon dioxide disposed of on-site, with the option to use some of it for secondary and tertiary recovery. With the increase of carbon capture tax credits, or carbon trading schemes, the economics of remote hydrocarbon discoveries change significantly.

It must, however, be kept in mind that the use of old oil and gas wells may not be ideal. Certainly their use has been heavily promoted by those who profit from them. But these wells were almost certainly drilled with heavy drilling mud, which plugged the rock formations. They have also likely been subjected to hydraulic fracturing which causes more formation damage. They are for the most part cased, so that the only places where carbon dioxide can contact the formation are the limited sections of the wellbore which have been perforated. Perforating also causes formation damage, including compacting of the rock around the perforated zone. Fines migration during years of production may have sealed off much of the permeability surrounding the wellbore. And although these wells are located close to pipelines to transport oil and gas, they may not have the pipeline infrastructure in place to bring carbon dioxide to the wells. The costs of creating this infrastructure may negate the benefits of using these depleted wells, except in areas of dense infrastructure such as the Permian basin.

Background—Drilling

The drilling of geothermal wells and the drilling of carbon sequestration wells both benefit greatly from the near balanced drilling techniques described in the referenced patent applications, in that the costs are lower and speed of drilling is greater than for conventional drilling techniques. The greatest benefit, however, is that these drilling techniques avoid formation damage during the drilling process. The natural fracture systems are not plugged with heavy drilling mud, and the permeability of the natural fracture systems within the rock formations is maintained. This improves the flow of fluids in geothermal applications, enhancing heat transfer. It improves the ability of the well to disperse carbon dioxide into the formations, increasing the sequestration capacity of the well and prolonging its useful life.

Using drilling techniques which do not damage the permeability and storage capacity of the natural fracture system brings the additional benefit that it is not necessary to resort to hydraulic fracturing to undo the damage caused by conventional drilling techniques. Not only does this approach reduce the overall cost, it does not need the huge volumes of water, sand and chemicals required by hydraulic fracturing.

What is desired is a way of combining and optimizing both carbon sequestration capability and the generation of geothermal based energy, thus achieving the maximum possible environmental and financial returns on the investment in each well.

SUMMARY

In one embodiment, there is provided a method for extracting geothermal energy from a well in the subsurface of the Earth, comprising: using a drill bit and a drill string to drill a well down to and into a hot rock formation, creating an outer annulus between the drill string and a resulting wellbore; installing concentric tubing inside the drill string to create an inner annulus and a closed loop fluid flow path; injecting a first heat transfer fluid down the outer annulus into the hot rock formation to create a cloud of the first heat transfer fluid within the hot rock formation, wherein no first heat transfer fluid is recovered from the hot rock formation; pumping a second heat transfer fluid down the inner annulus into the closed loop fluid flow path and back to the surface through the concentric tubing and converting heat collected by the second heat transfer fluid to useable energy.

In another embodiment, there is provided a method a method for combining geothermal energy generation and carbon dioxide sequestration in the same well comprising: using a drill bit and a drill string to drill a commercially viable geothermal well down to and into a hot rock formation, creating an outer annulus between the drill string and a resulting wellbore; installing concentric tubing inside the drill string to create an inner annulus and a closed loop fluid flow path; injecting supercritical carbon dioxide down the outer annulus and into the hot rock formation to create a cloud of supercritical carbon dioxide within the hot rock formation; pumping a heat transfer fluid down the inner annulus into the closed loop fluid flow path and back to the surface through the concentric tubing; converting heat collected by the heat transfer fluid to useable energy; collecting data using at least one instrument positioned within the well to assess the amount of carbon dioxide being captured within the hot rock formation and increasing the quantity of supercritical carbon dioxide injected into the outer annulus if the amount of carbon dioxide being captured is above a predetermined level thereby sequestering carbon dioxide in commercially significant quantities.

In another embodiment, there is provided a method for combining carbon dioxide sequestration and geothermal energy generation in the same well comprising:

using a drill bit and a drill string to drill a commercially viable carbon sequestration well down to and into a hot rock formation, creating an outer annulus between the drill string and a resulting wellbore; injecting supercritical carbon dioxide through the outer annulus into the hot rock formation to create a cloud of supercritical carbon dioxide within the hot rock formation surrounding the directional section of the wellbore, thereby sequestering the supercritical carbon dioxide; collecting data using at least one instrument positioned within the well to measure heat flow and either; where the heat flow rate exceeds a predetermined value, installing concentric tubing inside the drill string to create an inner annulus surrounding the concentric tubing and a closed loop fluid flow path; pumping a heat transfer fluid down the inner annulus into the closed loop fluid flow path and back to the surface through the concentric tubing and converting heat collected by the heat transfer fluid to useable energy, or where the heat flow rate is below a predetermined value, continuing to use the well only as a carbon sequestration well.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTION OF SOME EMBODIMENTS

Figure 1:
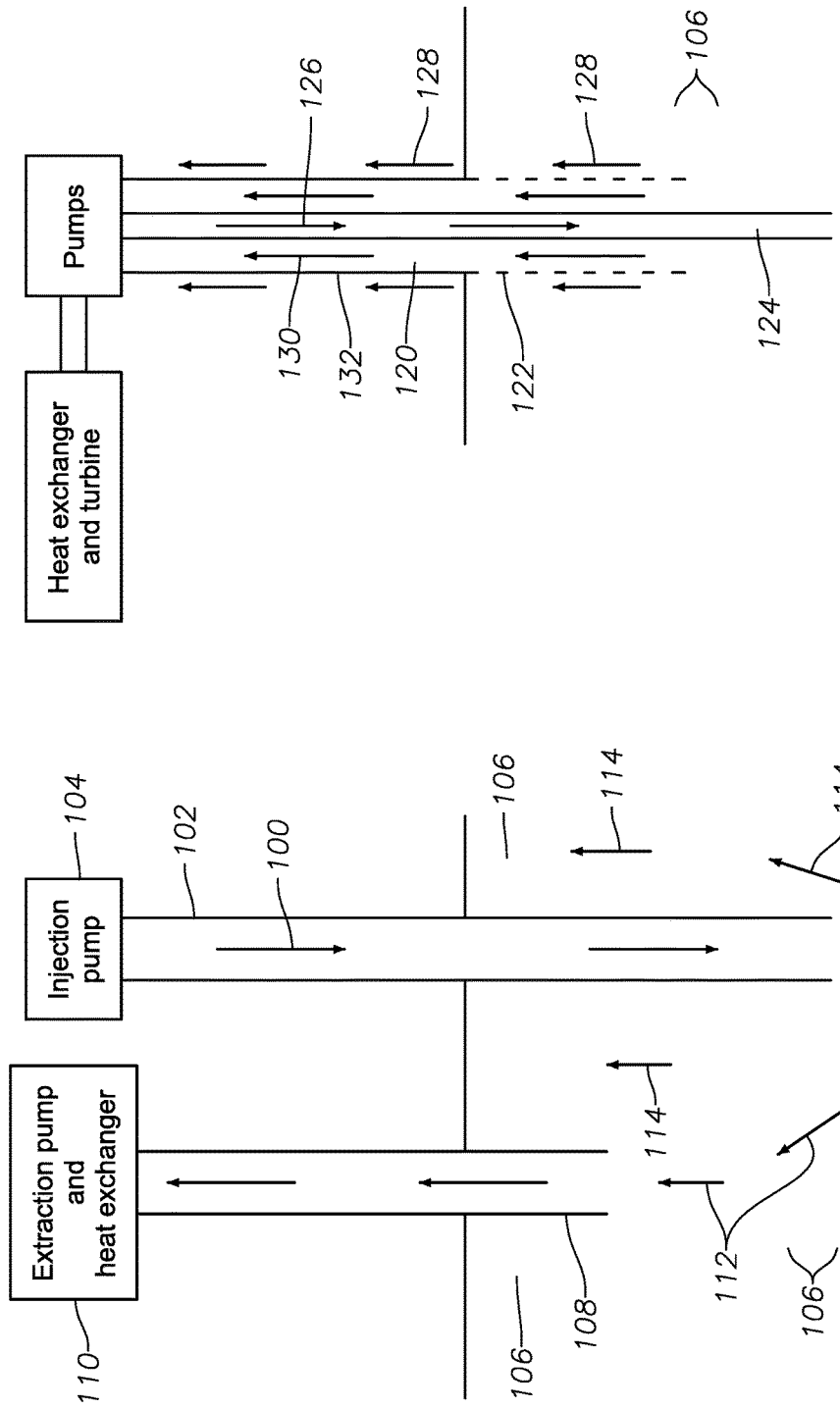
FIG. 1A shows a basic approach to active geothermal heat extraction.
FIG. 1B shows heat extraction using a perforated section of casing.

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well-known methods, processes and devices and systems finding application in the various embodiments described herein are not disclosed in detail.

Referring now to the drawings, embodiments of the present invention will be described. The invention can be implemented in numerous ways. Several embodiments of the present invention are discussed below. The appended drawings illustrate only typical embodiments of the present invention and therefore are not to be considered limiting of its scope and breadth. In the drawings, some, but not all, possible embodiments are illustrated, and further may not be shown to scale.

Any embodiments or applications of the inventions provided herein are intended as examples but are not intended to be taken as limitations.

Throughout this document, the term "directional well" or "directional wellbore" is defined to mean a well or wellbore which may be described as directional, horizontal, substantially horizontal, deviated, inclined, slanted, or follows a particular subsurface rock formation. The term is used to distinguish such a well or wellbore from a well or wellbore which is substantially vertical.

Turning now to the drawings, first consider a well drilled for geothermal energy generation using the plume approach. FIG. 1A shows the simplest approach to active geothermal heat extraction. It involves nothing more than pumping a heat transfer fluid 100, usually water, into a vertical injection well 102, using an injection pump 104, and injecting the heat transfer fluid 100 into a hot rock formation 106 where it will pick up heat. Then the heat transfer fluid 100 is pumped out of a vertical extraction well 108, usually slightly higher in the hot rock formation 106, and hopefully at a much higher temperature, using an extraction pump 110. The heated fluid may used directly to operate a steam turbine, to generate electricity. In other embodiments, the heated fluid is passed through a heat exchanger, and the heat used to create steam to drive a turbine generator. The theory is that much of the injected heat transfer fluid 100 will be flow towards and be captured by the extraction well 108, as indicated by flow arrows 112. However, in practice, it will be apparent to one of ordinary skill in the art that as the injected heat transfer fluid 100 is released from the vertical injection well 102 it will disperse rapidly through the natural fracture system, as indicated by flow arrows 114, and little of it will reach the extraction well 108. Therefore this approach is not very effective.

There are ways in which the effectiveness could be enhanced, such as surrounding an injection well with a ring of extraction wells, or vice-versa. This adds complexity on the surface as the heat transfer fluid may need to be pumped to a central heat extraction unit, or other steps taken to accumulate the extracted energy. Another enhancement might be to deviate the injection well so that the heat transfer fluid is injected directly below the extraction well, but again, dispersion through the natural fracture system will limit the amount of heat captured.

Another possible enhancement is show in FIG. 1B, where only one well 120 is required, and the heat extraction is achieved using a perforated section of outer casing 122 concentric with the fluid injection tubing 124. The heat transfer fluid 126 is pumped down the fluid injection tubing 124 as indicated by flow arrows 126 into the hot rock formation 106, and as it flows up around the perforated outer casing 122, as indicated by flow arrows 128, it is drawn through the perforations and up the annulus between the outer casing 132 and the fluid injection tubing 124 by the extraction pumps, as indicated by flow arrows 130.

Figure 2:
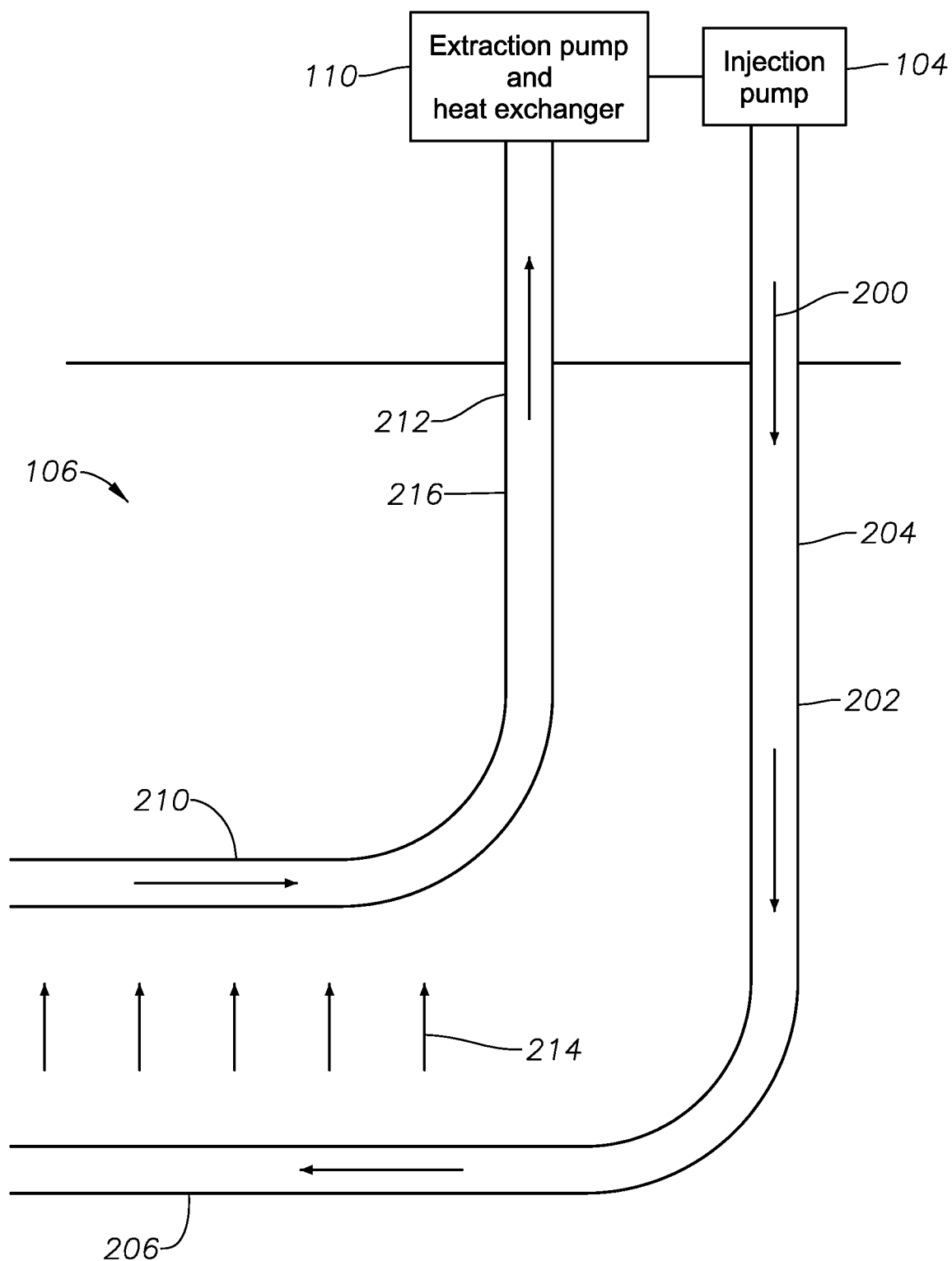
FIG. 2 shows the plume method of geothermal heat extraction with directional wells.

With modern drilling technology, it makes sense to drill horizontal or near horizontal wells to maximize the exposure of the heat transfer fluid to the hot rock formation. One possible embodiment of this approach is shown in FIG. 2. Heat transfer fluid 200 is pumped down an injection well 202, which has a vertical section 204 and a directional section 206. The heat transfer fluid is released into the hot rock formation 106 from the directional section 206 of the injection well 202. The heat transfer fluid 200 gathers heat from the surrounding hot rock formation 106 and rises towards the directional section 210 of an extraction well 212, as indicated by the flow arrows 214. It is then pumped back out of the vertical section 216 of the extraction well 212, and sent to the turbines or heat exchangers in order to generate electricity.

Figure 3:
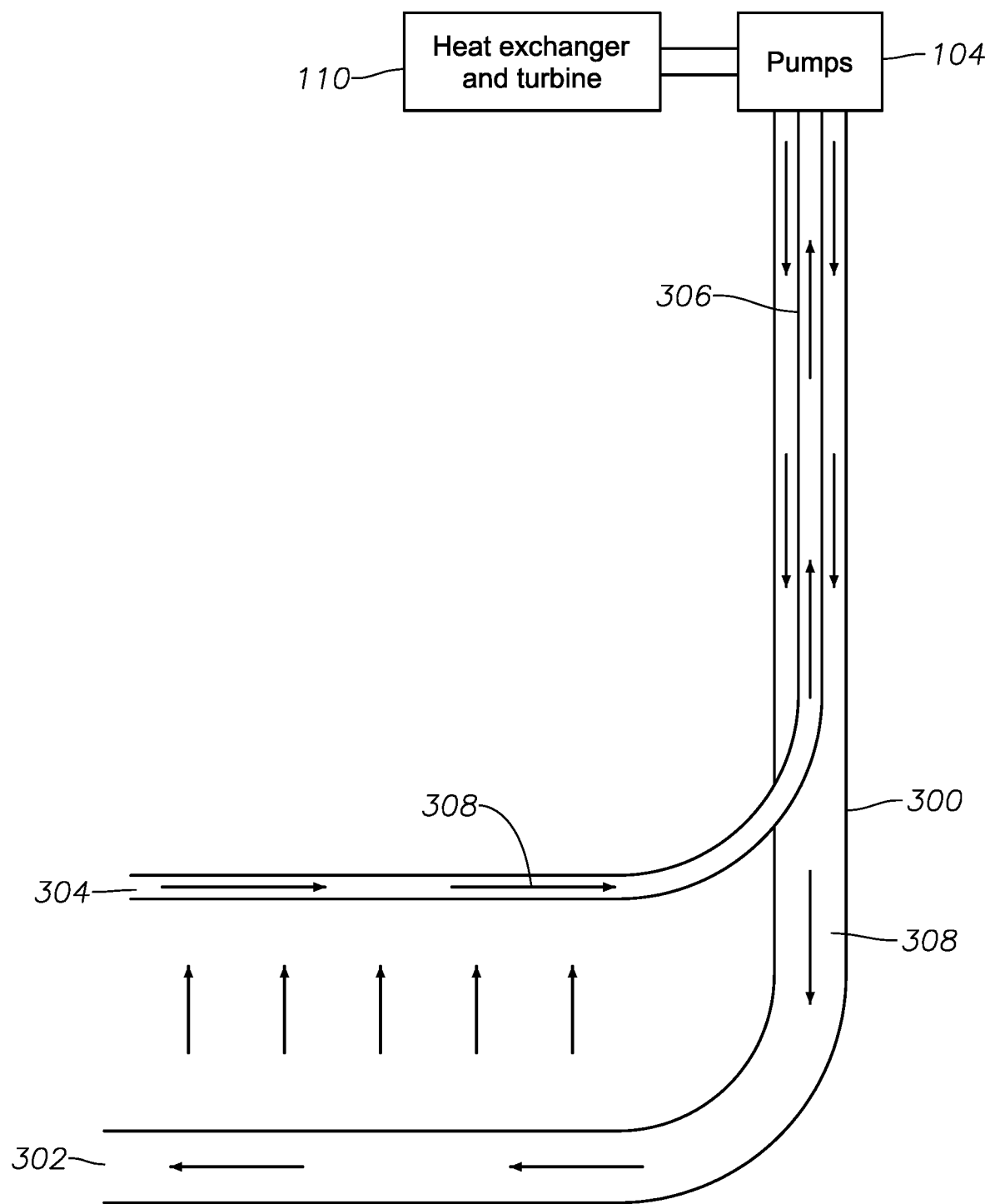
FIG. 3 shows the plume method of geothermal heat extraction with directional wells from one vertical well.

FIG. 3 shows a variation on this approach, which uses one vertical well 300 from which both the directional injection well 302 and the directional extraction well 304 are drilled. Concentric casing 306 allows for the pumping of heat transfer fluid 308 down the injection well 302 and up from the extraction well 304.

As mentioned above, it is common practice to attempt to gain higher rates of heat extraction by the use of hydraulic fracturing. The idea is that if the rocks are more fractured, more water will flow from the injection well to the extraction well. The risk is that hydraulic fracturing will open up a natural fracture system which actually diverts the heat transfer fluid away from the desired vertical path.

Figure 4:
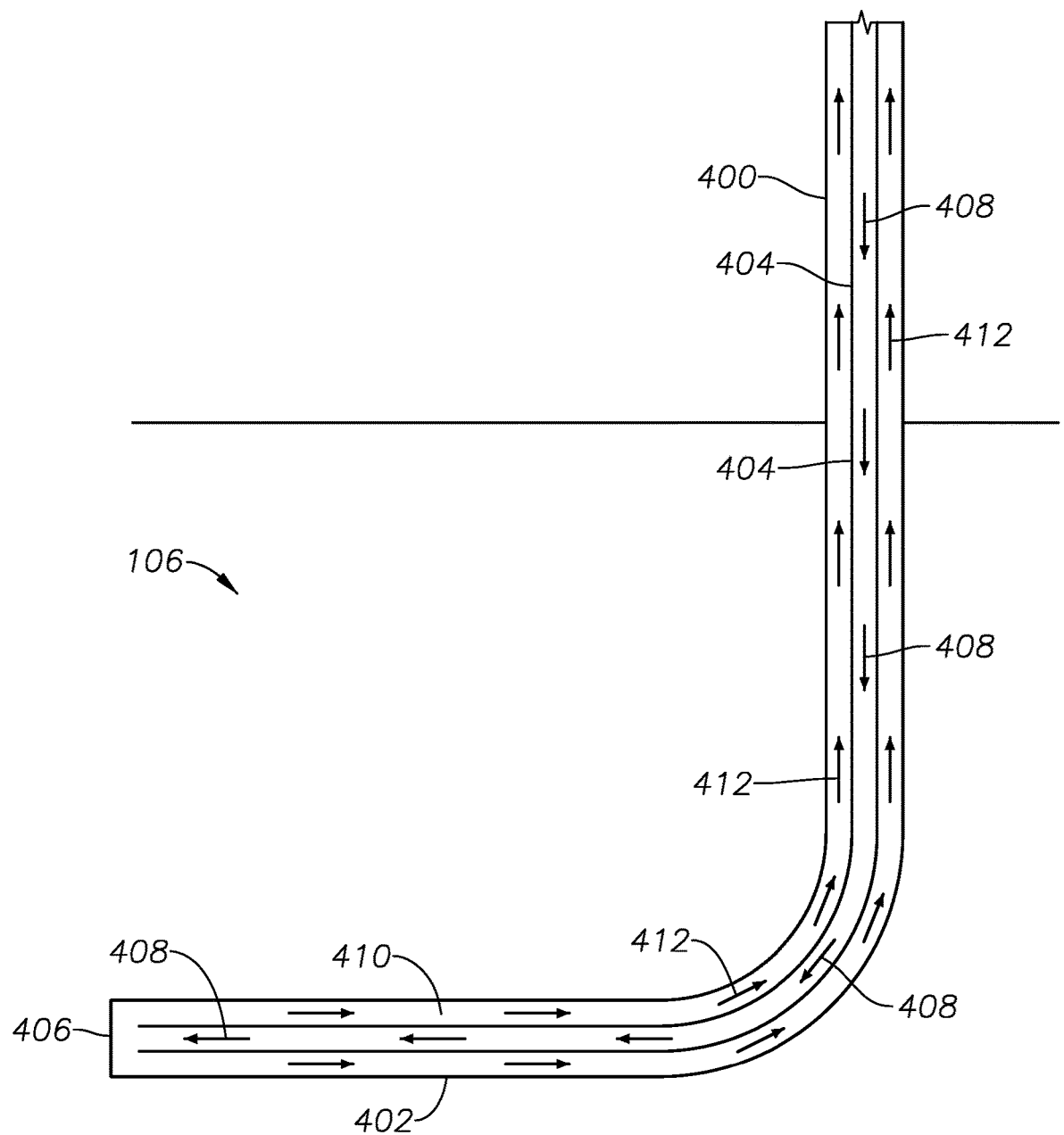
FIG. 4 shows a single well closed loop method of geothermal heat extraction.

FIG. 4 illustrates the closed loop approach. In FIG. 4, one vertical wellbore 400 is drilled, and a directional wellbore 402 is drilled from the vertical wellbore 400 into the hot rock formation 106. Concentric pipes 404 are installed so that a heat transfer fluid can be pumped down the vertical well 400 and along the directional wellbore 402 to the end of the wellbore 406 as shown by flow arrows 408. Then the fluid U-turns and is returned back up along and up the annulus 410 between the concentric tubing 404 and the wellbore 400, as shown by flow arrows 412. No heat transfer fluid is released into the surrounding hot rock formation 106. The theory behind this approach is that the heat flow from the surrounding rocks will be sufficient to replenish the heat extracted and transferred to the surface.

In practice, this does not seem to work as well as expected, because of rapid depletion of the heat in the surrounding hot rock formation, and various approaches have been tried to enhance the heat transfer. Extending the length of the directional well allows more time for the heat transfer fluid to collect heat at depth before returning to the surface. The more heat transfer fluid in the well, the more powerful the pumps must be to keep it circulating.

Figure 5:
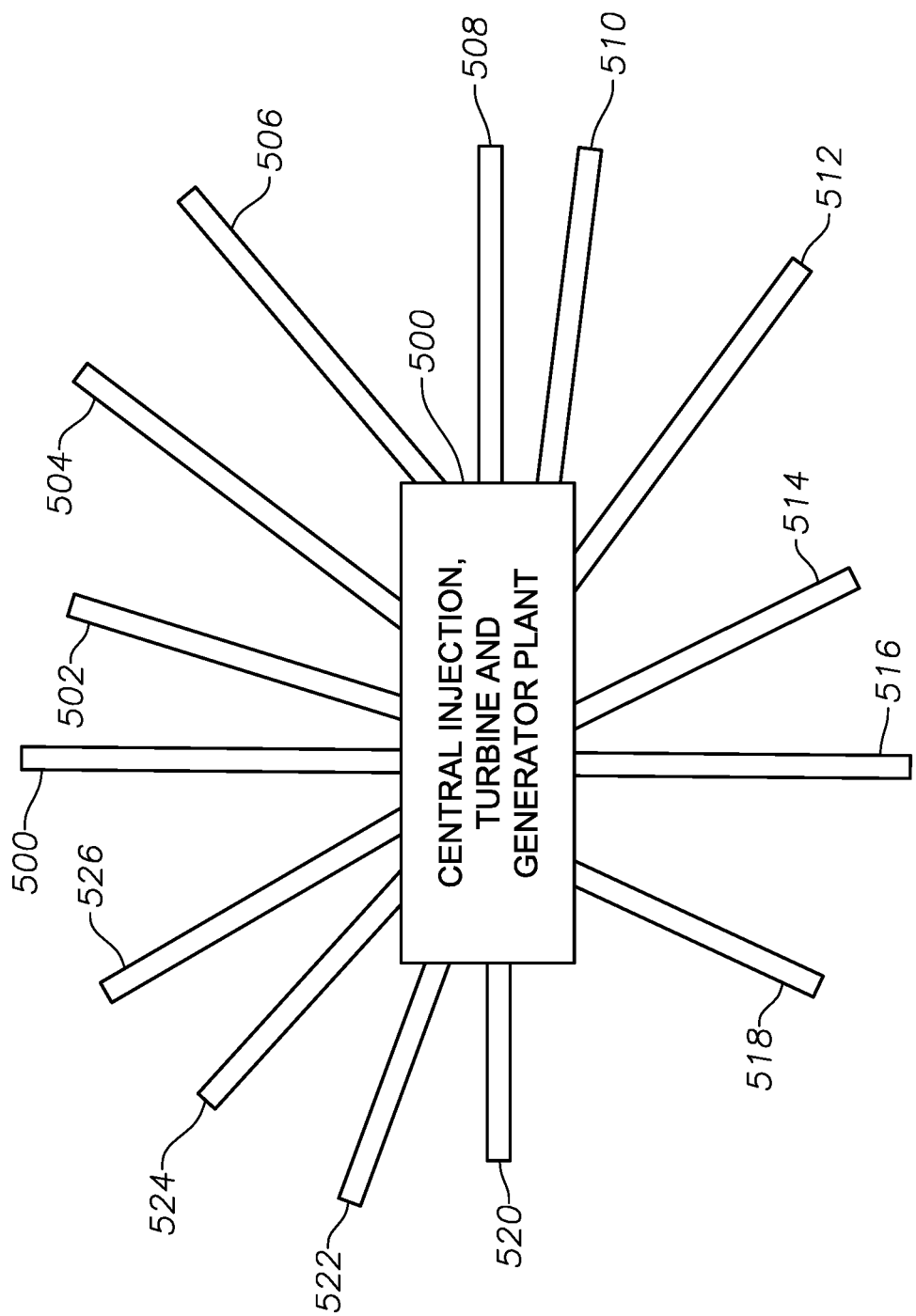
FIG. 5 shows a radial system of multiple directional wells for geothermal heat extraction.

As shown in FIG. 5, in some projects, a plurality of directional wells 502-526 are drilled in multiple directions from one vertical well, or even from multiple vertical wells on one pad, with a central pump and generator facility 500. Not only does this greatly increase the subsurface volume from which heat is being extracted, it allows for some directional wells to be recovering from heat depletion while others are still producing. Note that the radial spacing and the length of the wells are not the same between wells, but will be dictated by the geology and the available hot rock zones. FIG. 5 shows a plan view, but one of ordinary skill in the art will appreciate that multiple injection and extraction wells may also be drilled at differing depths.

Figure 6:
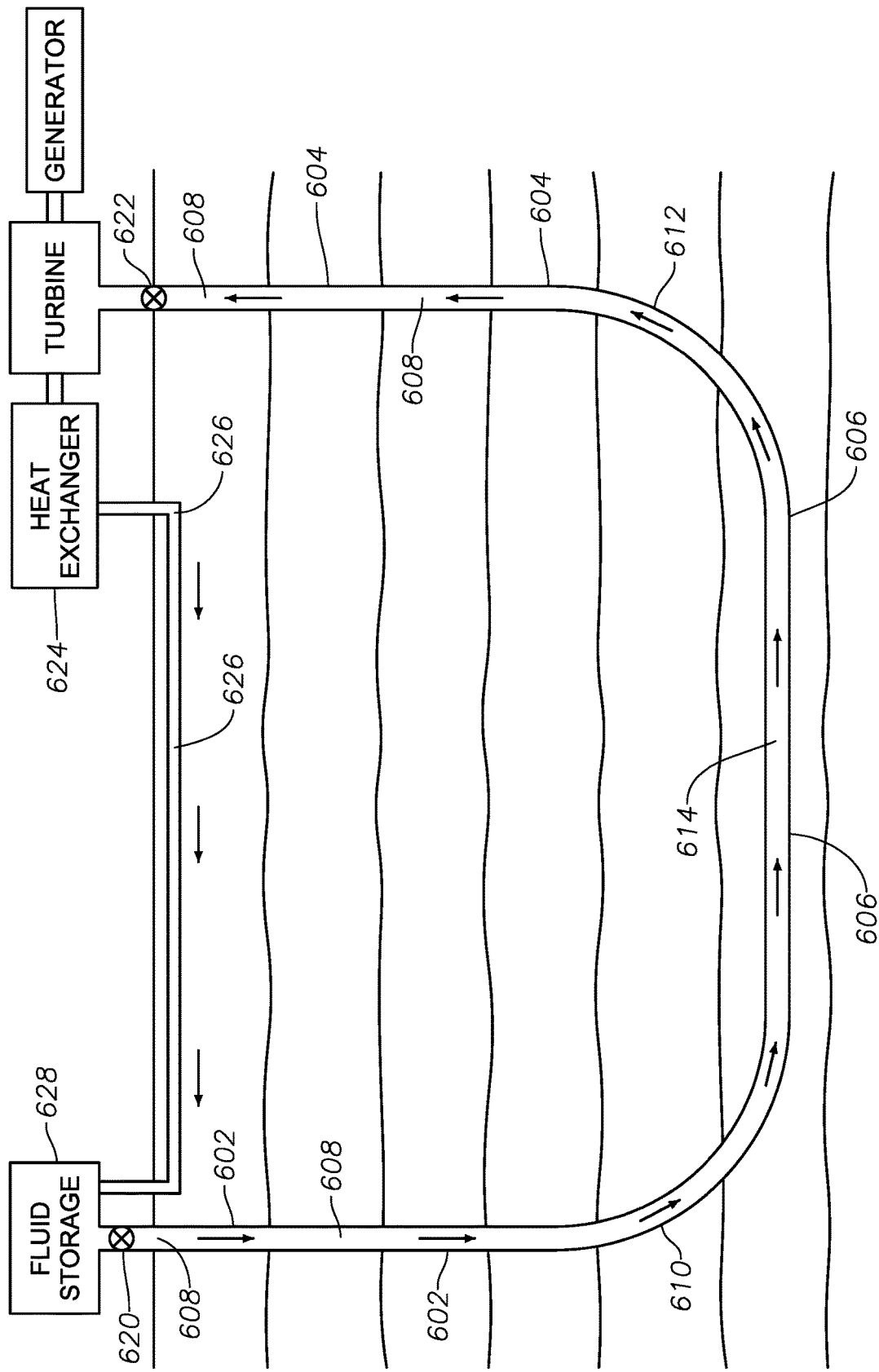
FIG. 6 shows a two-well closed loop method of geothermal heat extraction.

FIG. 6 shows a different closed loop approach where the injection well 602 and extraction wells 604 are a considerable distance apart, allowing for a long directional component 606 to the wellbore, which should translate to more heat being collected by the heat transfer fluid 608 while in transit through the hot rock formation. Drilling a well as shown requires sophisticated drilling techniques, which means high costs. A vertical well must be drilled at each site, the drill bit deviated as at 610, 612 to drill horizontally, and the two wellbores must meet 614 with a precision which is very difficult to achieve at the depths required for a geothermal well. The heat transfer fluid 608 is pumped down the injection well 602 by pump 620, and pumped out of the extraction well 604 by pump 622. After the heat brought to the surface has been used to generate electricity, at 624, the cooled heat transfer fluid 608 is pumped back along a pipe 626 and stored in a tank 628 from where it is pumped back around the loop.

The two-well closed loop approach can be adapted to a radial system, or a grid system, again with the intent of providing continuous power generation capability by using some loops while others recover from localized heat depletion.

The closed loop approach has sometimes encountered problems when using water as the heat transfer fluid. As the superheated water nears the surface, the pressure is reduced and the water then may turn into steam, creating vapor pockets which impede the flow, and may adversely impact the operation of the pumps. A similar problem, caused by cavitation, can occur at the end of the directional wellbore as the fluid is forced to rapidly change direction.

While all these approaches sound promising, geothermal energy generation has yet to really make an impact on the overall mix of energy. For the plume approach, dispersion of the injected fluid is frequently ignored or underestimated. In the closed loop approach, the most likely culprit is rapid depletion of heat in the rocks close to the wellbore, or in the area into which fluid is being injected and extracted. Ultimately, rock is an insulator. If heat is removed rapidly, the rock will cool and be subject to thermal stresses. That does promote more fractures, and hence more fluid flow in the plume method, but the effect is relatively insignificant.

Considering now the present invention, the previously discussed and other problems associated with previous geothermal techniques are addressed. In addition, various embodiments are disclosed where a geothermal well is combined with a carbon dioxide sequestration well, to obtain maximum return on the investment and extend the useful life of the well.

As previously described, some geothermal wells pump water or fluids into the rock formation, and hope to recover some of the plume of heated fluids, typically from a different well. Other geothermal techniques use a closed-loop system, where a heat transfer fluid is pumped down a pipe, and then back to the surface through the same well or a different connected well, but no fluid is released into the rock. Both these approaches have their drawbacks, as outlined above. To overcome these drawbacks, the present invention adopts a hybrid approach.

The embodiments disclosed herein inject a heat transfer fluid into the surrounding rock formation, as is done in the plume approach. The distinguishing feature of this hybrid approach is that the injected fluid is not recovered at any point in the process. It is allowed to fill the natural fracture system and form a cloud surrounding the wellbore, where it acts as a conductive heat transfer mechanism. No injected or naturally occurring fluids are recovered from underground in this approach. Therefore there is no need for equipment to deal with dissolved gases or minerals in the captured fluid as happens in the plume method.

Instead of attempting to capture the heat within this fluid from an expanding plume of injected fluid, the present invention relies on extracting the heat conducted towards the wellbore through the injected and/or naturally occurring fluid which is filling or has filled (i.e. formation water) the natural fracture system surrounding the wellbore. The heat extraction uses the concentric pipes of the closed loop method, carrying a heat transfer fluid to the end of the wellbore in one pipe, from where it is returned along the other of the concentric pipes.

This combination of the plume and closed loop technology overcomes the usual problem of closed loop systems, wherein the heat recovery rate drops as the heat from the nearby surrounding rocks is transferred into the fluid in the closed loop and hence to the surface. In the present system, the injected fluid acts as an effective heat transfer mechanism. The volume of rock filled with the cloud of injected fluid is constantly being expanded, increasing the available geothermal energy. The rate at which the injected fluid flows outwards from the wellbore is slower than the rate at which heat is conducted inwards from the rock volume towards the wellbore because heat allows flows from hot to cold. While there is some heat conduction through the rock, much of the heat reaching the wellbore is transferred through the injected fluid filling previously present the natural fracture system.

Figure 7:
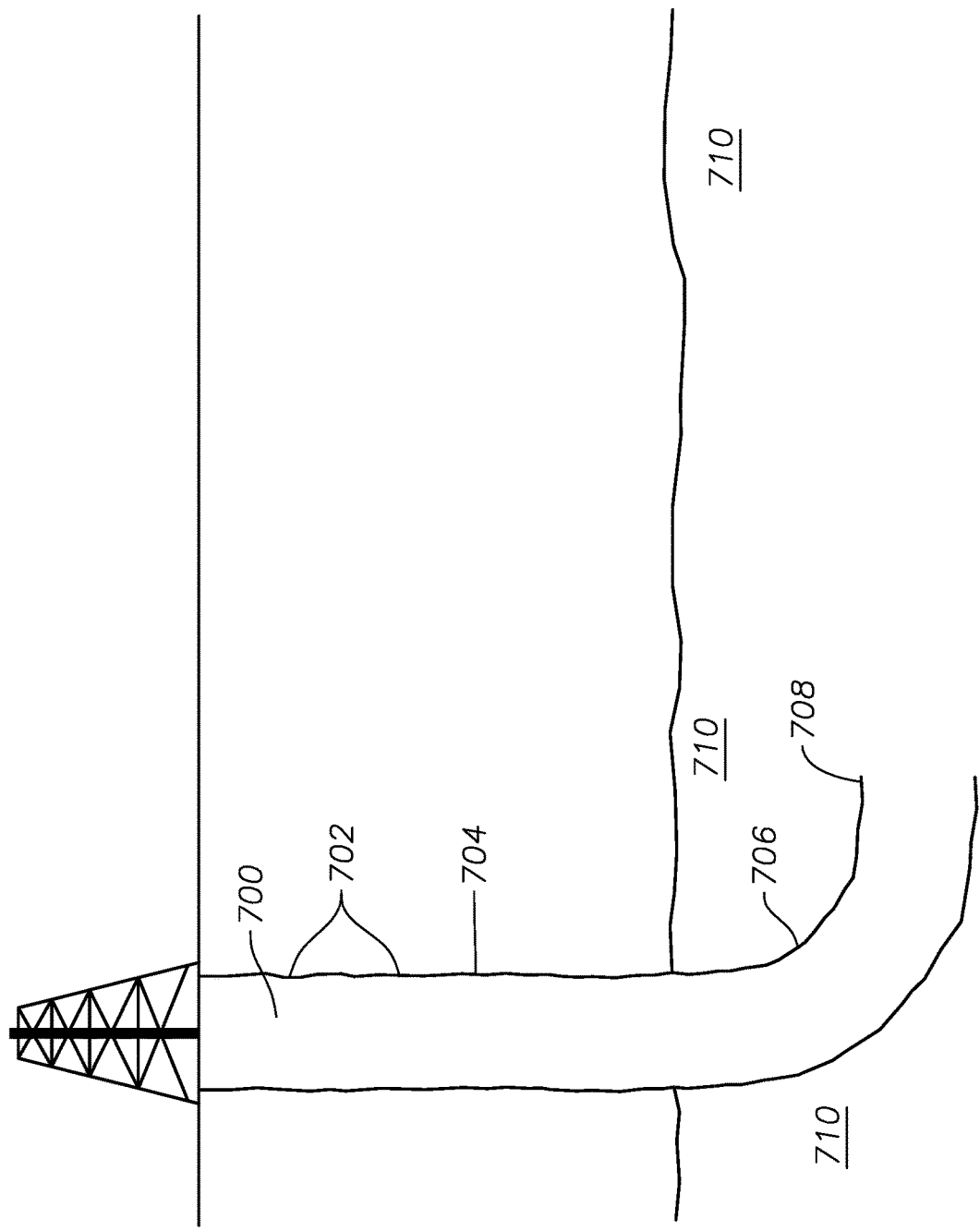
FIG. 7 shows the first stage of drilling a geothermal or sequestration well.

FIG. 7 shows the initial stages of drilling a geothermal energy well 700. Adopting techniques made possible by advances in drilling directional wells, the well is drilled with a vertical section 702, with casing 704, changing through a curve 706 to a directional well 708, in a suitable rock formation. The preferred embodiments of the present invention drill into the granite 710 bedrock, which is found everywhere, albeit at varying depths. Granite is hard, brittle, and naturally highly fractured. Importantly, granite contains uranium and other radioactive heavy elements, which decay, and in doing so, generate the heat for the geothermal energy project. It is of course possible to use all of the techniques disclosed herein in sedimentary rock formations.

The vertical section 702 of the well 700 may be drilled using conventional drilling methods. There is at this point no downside to conventional techniques which use drilling mud, because there is as yet no need to avoid formation damage. The vertical section 702 of the well 700 typically uses industry standard casing 704, in the United States, of 9⅝" diameter. Once the target formation, which in FIG. 7 is the granite 710, has been reached, the well is drilled as a directional well. In some embodiments, the vertical section 702 and the curve 706 are drilled using electric drilling motors.

Figure 8:
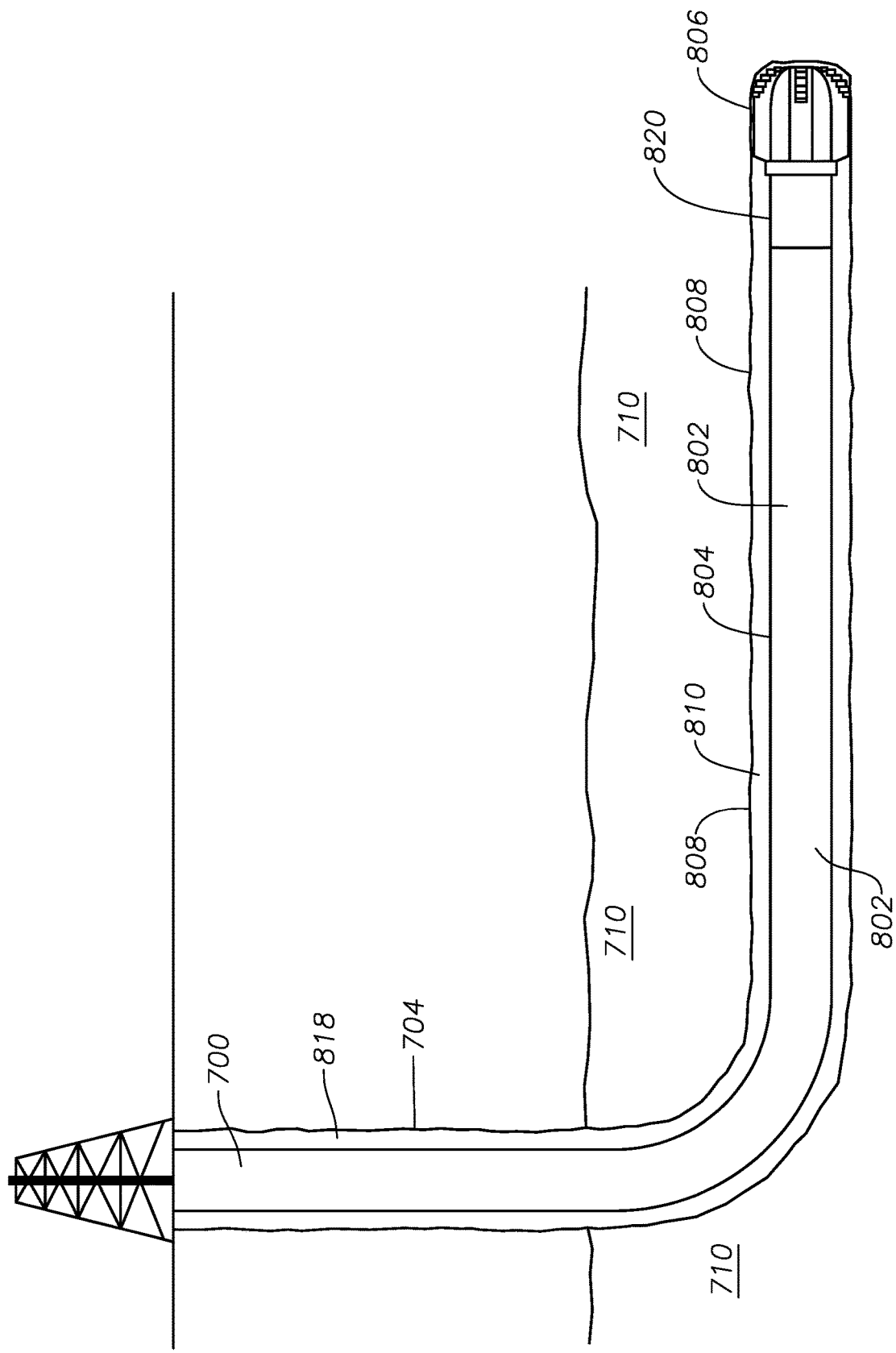
FIG. 8 shows the final stage of drilling a geothermal or sequestration well.

As shown in FIG. 8, the directional section 802 of the well 700 is always drilled underbalanced or near balanced to avoid the formation damage usually inflicted by the use of heavy drilling mud. See the '273 Publication for a detailed description of how this is done safely using an Annular Pressure Control Diverter and Near Balanced Reservoir Drilling (NBRD). The techniques disclosed in the '273 Publication are used to ensure that no fluid escapes from the well during drilling, including water, radon gas, or even hydrocarbons. Because the natural fracture system in the hot rock formation is not damaged in the NBRD method, there is no need for hydraulic fracturing or other remedial treatments.

In the embodiment shown in FIG. 8, the directional section 802 of the well 700 is drilled using a drill-in liner 804, which, for example, in the United States would have a diameter of 5½ inches. The drill bit 806 has a significantly larger diameter, approximately 10". No casing is set in the directional section 802, in a technique known as open hole drilling. The wellbore 808 will have the same diameter as the drill bit, and therefore there will be created an annulus 810 between the horizontal section of the drill-in liner 804 and the surface of the wellbore 808. There is also an annulus 818 between the casing 704 and the vertical section of the drill in liner 804.

In some embodiments, a jet pump 820 is installed behind the drill bit 806. Jet pumps create a powerful suction which removes cuttings from the area in front of the drill bit and enables high penetration rates. For a description of how a jet pump can be used to create a vacuum ahead of the drill bit, thereby creating true underbalanced conditions ahead of the drill bit to avoid formation damage, see U.S. Pat. No. 11,168,526, Entitled "Jet Pump Drilling Assembly", inventor William James Hughes, applicant Hughes Tool Company LLC, which is hereby incorporated by reference in its entirety.

Figure 9:
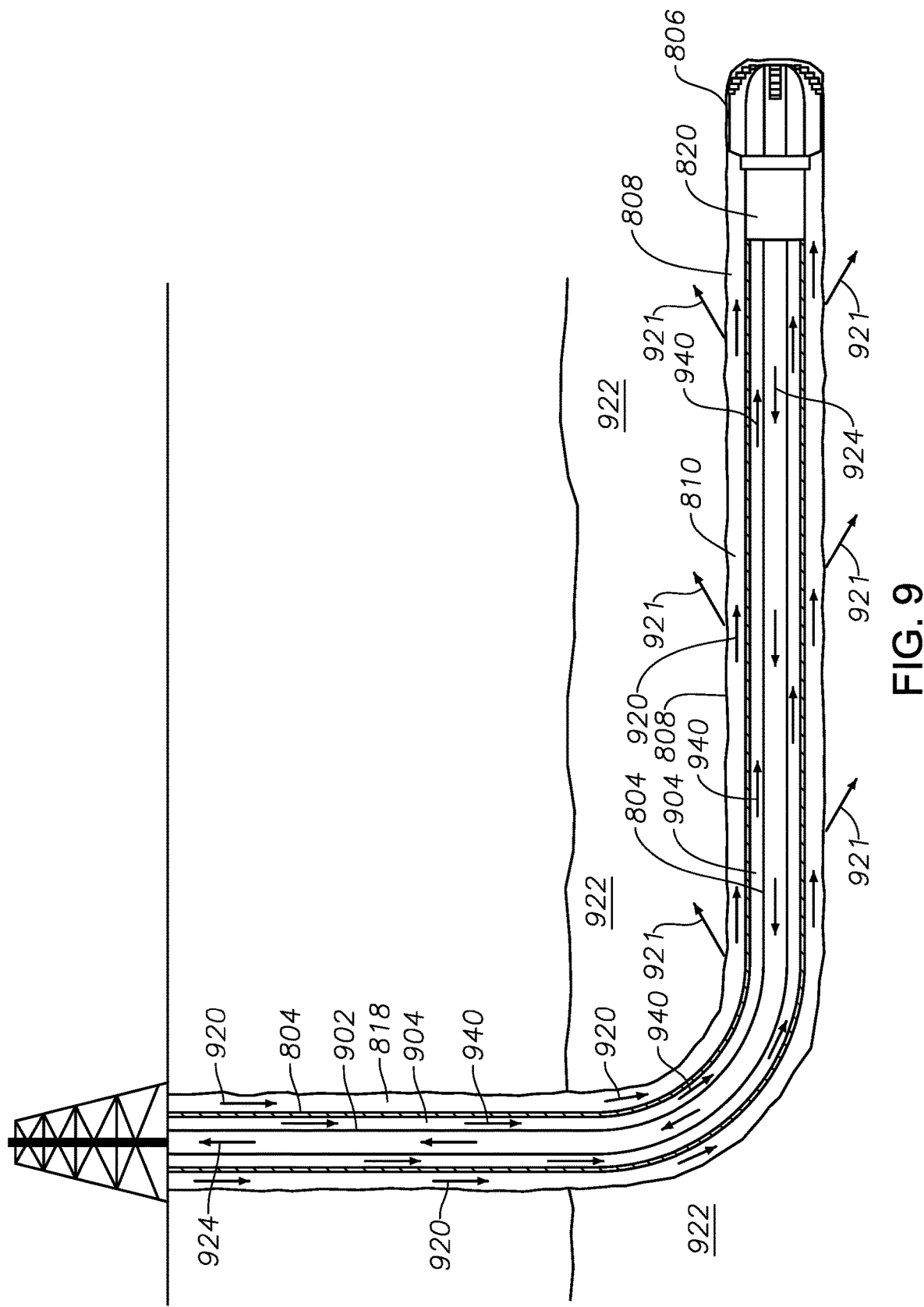
FIG. 9 shows a well configured for geothermal energy production and carbon sequestration.

FIG. 9 shows the geothermal well after drilling is completed. In the embodiments which use the drill-in liner 804, the drill-in liner 804 is a critical component of the closed loop system and is left in place when drilling is completed. Therefore the drill bit 806 and the jet pump 820 are also left in the wellbore 808. This is done in part to eliminate the costs associated with recovering the drill bit 806 and jet pump 820. It also creates the possibility of extending the wellbore 808 at a later time, either to extend the geothermal energy production or to prepare the well for carbon sequestration. Small diameter concentric tubing 902 is installed inside the drill-in liner 804, creating an inner annulus 904 between the drill-in liner 804 and the concentric tubing 902. In some embodiments, the pipe 902 is a vacuum insulated pipe.

Once the well has been drilled and the concentric tubing installed, the next step is to make the well operational. In some embodiments, a first heat transfer fluid 920 is pumped down the outer vertical annulus, 818, into the directional annulus 810. It will come into contact with the wellbore, 808, which is not cased. Therefore the first heat transfer fluid 920 will begin to migrate into the natural fracture system within the subsurface as shown by flow arrows 921. As the first heat transfer fluid 920 expands in all directions, it will create a cloud 922 of the first heat transfer fluid 920, filling the fracture system with an efficient means of conducting heat from the rock formation back to the wellbore. In prior closed loop systems, the outer surface of the concentric tubing system is in contact with the rock formation, which is an insulator. In the present invention, using open hole drilling means that the outer surface of the concentric tubing is surrounded by the first heat transfer fluid 920 in the directional annulus 810 which is in direct contact with the first heat transfer fluid 920 contained in the rock formation.

The closed loop system is then initiated by pumping a second heat transfer fluid 940 down the inner annulus 904 between the drill-in liner 804 and the concentric tubing 902. The second heat transfer fluid 940 is pumped to the end of the drill-in liner 804, where it U-turns and flows back along the concentric tubing 902 as shown by the flow arrows 924. This is the reverse of what was shown in the closed loop in FIG. 4, although the flow could have been reversed in that example. Where the concentric tubing 902 is a vacuum insulated pipe, it is preferable to use it to contain the upward flowing heated fluid and retain as much heat as possible as the second heat transfer fluid 940 returns to the surface.

Once the second heat transfer fluid 940 reaches the surface, the heat it now carries is used directly for heating or converted to electrical energy though a conventional system of heat exchangers and turbine-driven generators. As heat is pulled from the surrounding hot rock formation, it is replenished by heat conducted along the fracture network by the injected first heat transfer fluid 920. In this way, these hybrid embodiments overcome the disadvantages of both the plume and the closed loop approaches, by combining the two and using the best aspects of both.

Some previously tested techniques may be used in modified form to enhance the useful life of the well and increase its overall geothermal energy production. These include drilling multiple directional wellbores, and using each of them to extract subsurface thermal energy for a set period of time, followed by a recovery period to allow the injected first heat transfer fluid 920 to disperse through the natural fracture system, then injecting more first heat transfer fluid 920, and so on.

The injected first heat transfer fluid 920 which forms the cloud 922 may be water, brine, supercritical carbon dioxide, or captured flue gases, or a mix of any of these fluids. The use of supercritical carbon dioxide will result in enhanced heat transfer. Carbon dioxide can be converted to its supercritical form at relatively low temperatures and pressures −90° F. and 1070 psi will suffice. Supercritical carbon dioxide will therefore require some pressurization equipment, but like water, is harmless in case of a spill. It is non-toxic and non-flammable. Where the geothermal well may have potential for carbon sequestration, either simultaneously with energy production or later in its life cycle, as will be discussed below, the use of supercritical carbon dioxide will make commercial sense, as it will be readily available on site and essentially free.

The closed loop second heat transfer fluid 940 may be the same as the injected first heat transfer fluid 920, or it may be a different fluid. There is no requirement that the injected fluid 920 and the second heat transfer fluid 940 be the same fluid. In some embodiments, supercritical carbon dioxide is used as both heat transfer fluids because of its superior heat transfer properties. In various other embodiments, different fluids may be used. Water or brine may be used, or various types of heat conducting oils.

In some embodiments, the well is primed with injected first heat transfer fluid 920 for some time to enable heat transfer before it is put online to generate geothermal energy. The first step in the priming process is to pump supercritical carbon dioxide into the well. The supercritical carbon dioxide will begin to flow through the natural fracture system and disperse outwards from the well. Depending on the temperature and pressure in the rocks surrounding the well, the carbon dioxide may drop out of the supercritical state, but as more carbon dioxide is pumped into the well, the pressure will build to the point where it becomes supercritical again. Once the process of pumping carbon dioxide has reached a point where the subsurface volume surrounding the well is beginning to fill with supercritical carbon dioxide, the well is ready to be configured as a geothermal well.

Turning now to wells drilled for carbon sequestration, wherein carbon dioxide is pumped into permeable underground rock formations, a similar approach is used.

Consider now wells drilled initially as carbon sequestration wells. As mentioned above, many people assume that carbon sequestration requires existing depleted or abandoned oil or gas wells. This assumption is based on economic, not technical, considerations. Obviously using an existing well avoids the cost of drilling a well. However, this approach fails to consider several important factors. The carbon dioxide is often generated or captured at considerable distances from available oil or gas wells, thus requiring a pipeline to transport the CO2. The costs of building such a pipeline, including acquiring permission from multiple landowners, can be enormous. Opposition to a pipeline for a variety of reasons can be expected, and the entire construction process may take years, if it happens at all.

The second problem with using depleted wells is that they were almost certainly not drilled with carbon sequestration in mind. They were probably drilled with conventional drilling techniques, including the use of heavy drilling mud, which damaged the rock formations by plugging the natural fracture system. The damage was then compounded by fracing, which pushes the mud further into the fractures and pores. A typical fraced well has a relatively short productive life, and is not suitable for repurposing as a sequestration well.

A third potential problem with using depleted oil wells, at least in the United States, is one of ownership. Under US law, ownership of the surface rights is often separate from ownership of subsurface mineral rights. However, it is generally held that ownership of the subsurface pore space belongs to the owner of the surface rights. Pore space has been considered legally as consisting of a "lack of minerals", not as a part of the mineral rights. This means that while an owner or lessee of the mineral rights may have the right to extract oil and gas, they likely do not have the right to fill up the resulting pore space with carbon dioxide or anything else. A whole new set of agreements with the surface rights owner would be needed before sequestration could take place.

All of these problems can be overcome by drilling wells specifically for the purpose of carbon sequestration. The use of modern drilling techniques and technology allows wells to be drilled cost-effectively, close to the source of the carbon dioxide to be sequestered, and with no formation damage which would reduce the overall storage potential of the well. The inventions described herein take advantage of the advanced NBRD drilling techniques, described in the '005 patent application These inventions emphasize avoiding formation damage and leaving the natural fracture system intact.

When the objective is to drill a carbon sequestration well, the same process is followed as described above and shown in FIGS. 7 and 8. The use of the drill-in liner 804 allows the entire directional wellbore 808 to act as a dispersal mechanism for the supercritical carbon dioxide being pumped into the annulus 810. The result is far more supercritical carbon dioxide flowing into the rock formation than methods which use a cased well with perforations at intervals, severely limiting the fluid flow. Eliminating the cost and time required for perforating the casing is an additional benefit.

The concept of carbon sequestration is not new. Nor is the generation of power using geothermal energy. The combination of the two in one well is not new, but suffers from less than optimal design. The present invention is novel in that it combines these two purposes, using one well for both purposes, but uses a phased, integrated and optimized approach, potentially providing a double benefit at very little additional cost.

While others have suggested combining carbon sequestration and geothermal energy production in the same well, their approaches usually employ the inefficient plume method described above, and attempt to press a geothermal well into service as a sequestration well. One disadvantage of a such a forced combination is that the requirements for optimizing a sequestration well may not be the same as the requirements for optimizing a geothermal well. As detailed below, the present invention enables the optimization of the well for both uses.

Another disadvantage is that the project may not be a financial success if one or the other aspects of the project fails to deliver quite the expected results. It appears that most projects of this sort began as geothermal projects using carbon dioxide, which produced less stellar results than expected. They were then re-characterized as sequestration wells. Indeed, the Achilles' Heel of the plume method, the dispersion of the injected fluid, can only be described as a positive feature if it is thought of as a means to pump carbon dioxide underground. The more the carbon dioxide disperses, the worse the geothermal performance, but the better the sequestration capability, more or less by accident.

One of the earlier references to the use of supercritical carbon dioxide is found in U.S. Pat. No. 6,668,554 to Brown, entitled "Geothermal Energy Production with Supercritical Fluids", which is hereby incorporated by reference in its entirety. The techniques described in this patent disclose a plume approach, where the carbon dioxide is allowed to fill a volume of the subsurface, and is then captured and returned to the surface where heat energy is extracted. This suffers from the usual problem with the plume approach, that the plume expands, and only a small percentage of any injected fluid actually flows into the extraction wells.

A more recent example of the plume approach is seen in U.S. Pat. No. 8,316,995 to Saar et al., entitled "Carbon Dioxide-Based Geothermal Energy Generation Systems and Methods Related Thereto". This patent relies on the presence of an impermeable caprock, as is made clear in the claims, to trap the plume. It does at least acknowledge the problem of trying to inject a fluid into a rock formation and then recover the fluid from the expanding plume at some distance away within the subsurface.

Given the potential for using one well for both purposes, certain embodiments of the present invention propose a phased, integrated and optimized approach to combining geothermal energy generation and carbon sequestration. Further, the phases may be implemented in different sequences, depending on several factors, and in particular on the economics of the project.

In some embodiments of the present invention, the well is first created as a geothermal well, and in the long term, its potential for carbon sequestration is evaluated. In other embodiments, the process begins with the drilling of a well for the purpose of carbon sequestration. Once carbon dioxide is being pumped into the well, and begins filling the natural fracture system, the well is evaluated for its potential as a geothermal well.

In either case, the ideal project would be conducted in an area with known properties which indicate that a well is suitable for both purposes. For such a project, the definition of "suitable" has multiple factors. The formation must be at sufficient depth to ensure that the carbon dioxide will remain sequestered and will not migrate back to the surface. Unlike hydrocarbons, including fracing fluid, there would be no significant environmental harm if it did, but it would negate the point of sequestration. The formation must have sufficient porosity to absorb large quantities of carbon dioxide, and sufficient permeability to allow the carbon dioxide to disperse from the injection well into the formation. The chemical composition of the formation matters, because the long term goal is for the carbon dioxide to react with the rock and become part of the formation. However, if the rock reacts too rapidly with the carbon dioxide, the permeability of the formation surrounding the well could deteriorate, blocking the flow and rendering the well useless.

For the present invention, "suitable" includes factors not normally considered critical for a sequestration well. These include the temperature of the formation and the heat flow characteristics of the rock. These factors are important in order for the well to be used as a geothermal well, either simultaneously with the carbon sequestration or subsequently.

It is also potentially feasible to evaluate existing geothermal wells for carbon sequestration and existing sequestration wells for geothermal potential, although doing so is less likely to produce optimal results than when the well is intended to be dual-use from the start.

In some embodiments a geothermal well is drilled and equipped with sensors, including temperature, pressure, flow rate, and others. Measurements are taken before and during the injection of the supercritical carbon dioxide, and during periods when the injection is paused to determine the drop in pressure caused by the supercritical carbon dioxide dispersing into the surrounding formation. These measurements may in some embodiments be combined with other data, including well logs from the geothermal well and other wells in the area. Active or passive seismic surveys can provide valuable insight as to the extent and directionality of the cloud of injected fluid. In this way, the potential for using the well as a carbon dioxide sequestration well can be evaluated, even while generating energy to cover the costs of the well.

As supercritical carbon dioxide is pumped into the well, and disperses, data can be collected which will show the rate of dispersion, the rate of heat transfer, and other factors. Some data comes from sensors in the well. Other data, especially concerning the natural fracture system and the rate and extent of the dispersion of the supercritical carbon dioxide is obtained using passive or active microseismic methods. Such surveys may include surface sensor arrays, or DAS cables within the well. For example, a DAS cable could be attached to the outside of the pipes used for the heat transfer fluid flow. Analysis of seismic data obtained as the pumping of the supercritical carbon dioxide begins and progresses will show how the fluid is dispersing through the natural fractures. It will also confirm that the fluid is not leaking out of the formation in which it is supposed to be sequestered. That may be more important from a public perception standpoint than for technical reasons.

In some embodiments, there may exist options for sequestering carbon dioxide while simultaneously generating geothermal energy. In other embodiments, carbon dioxide may continue to be sequestered long after the well has reached the end of its useful life as a geothermal well. In yet other embodiments, the geologic conditions and the economics may suggest beginning carbon dioxide sequestration only after the well is not longer productive as a geothermal well. Much will depend on factors such as the availability of carbon dioxide to be sequestered, tax credits and other incentives, and whether the carbon dioxide must be brought to the site, and if so, how.

There will sometimes be some wells where the analysis of the measurements leads to the conclusion that while it is possible to create a subsurface volume filled with supercritical carbon dioxide for geothermal heat transfer, the geologic conditions may not support a full carbon sequestration project. This possible outcome must be taken into account when figuring the economics of the geothermal project.

In some other embodiments, the approach described above is reversed. That is, a well is drilled with the intention of using it for carbon sequestration, and recovering the costs of the project based on that use alone. As supercritical carbon dioxide is injected into the well, instruments in the well provide the basis for a detailed evaluation of the potential of the well as a geothermal well. If the formation is highly fractured, the supercritical carbon dioxide may disperse rapidly and not form a cloud around the well, as would be desired for geothermal heat transfer. If the formation proves suitable for generating geothermal energy, then the concentric tubing of a closed loop system is installed in the well.

Again, both technical considerations and market conditions and other economic factors will determine whether the well is used simultaneously for sequestration and geothermal energy generation, or if the geothermal phase should be implemented as the well reaches the end of its useful life as a sequestration well.

For a sequestration well, the carbon dioxide will eventually fill the fracture system to the point where pumping more carbon dioxide into the well would require significantly higher pressures than might be advisable. The carbon dioxide will also react with the rock and over a period of time will form carbonate deposits which will block the natural fracture system. At that point, the well has reached the end of its useful life as a sequestration well. However, it may still be useful as a geothermal well.

If a combined use well reaches a point where the sequestration capacity is reaching its limit, it may be converted to a geothermal-only well, with periodic injections of supercritical carbon dioxide to maintain the cloud of heat transfer fluid close to the well as the fluid further from the well disperses outwards.

As previously mentioned, the requirements for an ideal well may differ between geothermal energy generation and carbon sequestration. Therefore the phased approach described herein necessitates careful analysis of factors such as the length of the directional wellbores, the diameter of these wellbores, and whether or not they are cased.

One of the additional benefits of using a drill-in liner, and leaving the drill bit in the wellbore, is that the wellbore can be extended simply by adding more drill-in liner at the surface and recommencing drilling for as far as is required. This approach can be used to extend the useful life of the well. The same technique applies if a geothermal well is drilled and operated, and later it is determined that it should be lengthened for use as a sequestration well, or a sequestration well needs to be extended for geothermal use. The embodiments described herein thus offer a degree of flexibility not found with conventional drilling techniques.

It will be immediately obvious that there is no problem when the well is drilled first as a carbon sequestration, and later the geothermal closed loop concentric tubing is designed to be shorter than the sequestration well. It is even possible to close off the wellbore at the end of the closed loop, so that supercritical carbon dioxide injected from then on would continue to flow only into the section of the subsurface around the closed loop.

The above embodiments describe the use of directional wells, usually horizontal, because the geothermal industry has taken that approach to maximize heat gain in the plume approach. It also makes drilling a borehole for a closed loop system easier when a suitable sedimentary hot rock formation is available and is oriented substantially horizontally. However, the present invention is equally applicable both to a sedimentary hot rock formation and to the granite underlying the sedimentary rocks. As previously mentioned, granite contains decaying radioactive materials and is the source of some geothermal heat. Therefore drilling into the granite provides access to that heat. Heat rising from the Earth's core is the other source of geothermal heat, and of course, the deeper the well, the closer it is to that heat. Once a well has reached the granite, it is then possible to continue drilling for thousands of feet vertically while still remaining in the granite.

Therefore some embodiments of the present invention use only a vertical well, drilled deeper than most geothermal wells, for several thousand feet into the granite, using the drilling techniques previously described. Granite is highly fractured, and so this deep wellbore would cross multiple natural fracture systems. This contrasts with a sedimentary hot rock formation which may have a thickness measured in feet and only one major fracture system.

Other embodiments employ inclined wells to drill to the granite formation from an offset location. Drilling a vertical or inclined well results in a significant cost savings when compared to drilling a curve. It removes the need for a directional drilling crew and saves tripping the bit at least twice when compared to drilling a horizontal well.

Figure 10:
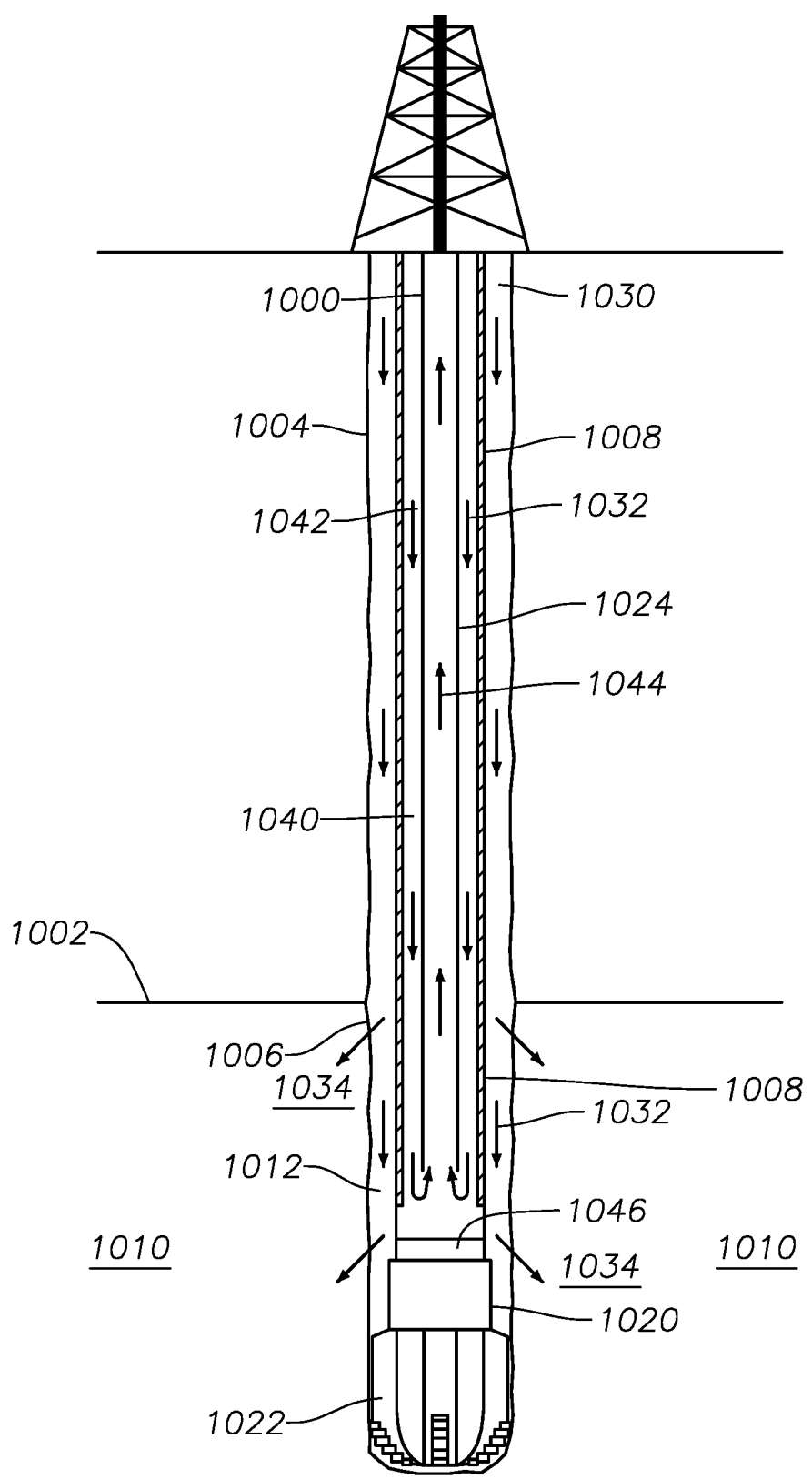
FIG. 10 shows a vertical well drilled into a granite formation and configured for geothermal energy production and carbon sequestration.

As shown in FIG. 10, in some embodiments, the well 1000 is drilled to the top of the granite 1002 and cased 1004, and then a wellbore 1006 is drilled using open-hole techniques and a drill-in liner 1008 through the granite 1010, creating an outer annulus 1012. A jet pump 1020 and electrically powered drills 1022 are used in some embodiments, as they offer a high penetration rate and relatively low cost. The jet pump 1020 and drill bit 1022 are left in the wellbore as the cost of recovering them exceeds the cost of the units themselves.

As with the previously described embodiments, concentric tubing 1024 is installed to form a closed loop system with an inner annulus 1028. In some embodiments, a first heat transfer fluid 1030 is pumped down the outer annulus 1012 as shown by the flow arrows 1032. It will come into contact with the wellbore 1006, which is not cased. Therefore the first heat transfer fluid 1030 will begin to migrate into the natural fracture system within the granite 1010. As it expands in all directions, it will create a cloud 1034 of the first heat transfer fluid 1030, filling the fracture system with an efficient means of moving heat from the rock formation back to the wellbore.

The closed loop system is then initiated by pumping a second heat transfer fluid 1040 down the inner annulus 1028 between the drill-in liner 1008 and the concentric tubing 1024 as shown by the flow arrows 1042. The second heat transfer fluid 1040 is pumped to the closed end 1010 of the drill-in liner 1008, where it U-turns and flows back up the concentric tubing 1024 as shown by the flow arrows 1044. Once the second heat transfer fluid 1040 reaches the surface, the heat it now carries is used directly for heating or converted to electrical energy though a conventional system of heat exchangers and turbine-driven generators.

Whether the well is vertical, inclined, or directional, it is necessary to prevent the second heat transfer fluid 1040 flowing out of the drill bit 1022, thus ensuring that it flows back up the concentric tubing 1024 In some embodiments, where a jet pump 1020 is in place just behind the drill bit 1022, a plug 1046 is placed then behind jet pump 1020 to force the second heat transfer fluid 1040 to return up the concentric tubing 1024. In some other embodiments, where the jet pump 1020 is not used or is not present, a plug 1046 of rubber or similar material is installed into the wellbore 1006 behind the drill bit 1022, sealing off the drill bit 1022 and preventing fluid loss.

These vertical or near vertical embodiments have an advantage over the horizontal wells which is legal, not technical. As mentioned previously, the law in the United States and some other countries says that the pore space belongs to the surface rights owner. Whether using a plume approach or the hybrid approach disclosed herein, a heat transfer fluid is injected into the pore space. A horizontal wellbore may inject fluid and thereby occupy pore space which is subject to the rights of multiple landowners. A vertical wellbore obviously requires only rights to the surface, and the pore space, for a relatively small distance around the well.

The removal of the complex issue of pore space rights, and the potential high legal costs associated with securing those rights, makes the vertical well approach to geothermal energy generation both more affordable and more practical for smaller scale projects. The benefits are even more substantial when it is desired to put a geothermal energy plant close to urban and suburban areas, where surface land ownership is highly fragmented.

Consider, for example, an electricity generating plant powered by natural gas. Sequestering the carbon dioxide generated by the plant takes, according to some estimates, 10-15% of the energy generated by the plant. Even then, the lack of pipelines to move the carbon dioxide to a sequestration facility often makes such projects impractical. However, a vertical well drilled on the land already occupied by the generating plant would not only have the capacity to sequester the carbon dioxide from the plant, it could also generate electricity from the geothermal heat capture, making up for the power lost to the sequestration process. Thus the plant would generate as much electricity as it previously did, but that electricity would be carbon-neutral. Such an operation could be halted, or become prohibitively expensive, if the carbon dioxide were sequestered in a horizontal well which extended into adjoining properties.

In the case where the available well pad site is towards the boundaries of the property, an inclined well allows the heat transfer fluid to be injected underneath the center of the property, thereby avoiding the fluid leaking into the pore space beyond the property boundaries.

As with the directional well embodiments described above, the vertical well embodiments may be applied to a geothermal only well using the hybrid method of injecting fluid into the pore space but not recovering it. It may also be applied to sequestration wells, and geothermal-sequestration combined wells using the phased approach.

Various researchers have shown that granite not only contains multiple fractures, but that these fractures are interconnected and allow fluid to flow through the subsurface. See for example "CO2 injection to granite and sandstone in experimental rock/hot water systems" by Lihui Liu et al., Pergamon, Energy Conversion and Management 44 (2003) 1399-1410, which is hereby incorporated by reference in its entirety. This publication states on page 1 "Our results suggest that it may be possible for granite and/or sandstone to 'capture' $CO_2$ at hydrothermal conditions and that underground disposal may be a feasible solution to reducing atmospheric emission of CO2". This publication uses a plume approach to geothermal energy generation with the CO2 injected along with geothermal waste fluids, which is far less efficient than the embodiments disclosed herein.

See also "Enhancement of Permeability Activated by Supercritical Fluid Flow through Granite" by Tsuyoshi Nohara et al., Wiley, Geofluids, Volume 2019, Article ID 6053815, https://doi.org/10.1155/2019/6053815, which is hereby incorporated by reference in its entirety.

In any of the above embodiments, regardless of whether the geothermal well or the sequestration well comes first, it is possible to add thermoelectric power generation to take advantage of the temperature differential between the surface, or near-surface, and the deeper sections of the well. The Seebeck effect is a voltage which occurs across the contact points of two different electrically conducting materials when there is a temperature difference between them. For a discussion of this effect, and how it is used to generate power in a geothermal setting, see "A Novel Approach for Downhole Power Generation in Geothermal Wells Using Thermoelectric Generator" by Jainish Shingala, Manan Shah, PROCEEDINGS, 45th Workshop on Geothermal Reservoir Engineering, Stanford University, Stanford, Calif., Feb. 10-12, 2020 SGP-TR-216.

Thermoelectric power generation may be used in combination with the various embodiments of the present invention in order to produce electricity to operate pumps, direct carbon capture machines, and other equipment. The potential for the use of this additional power is obvious when considering operations in a remote environment, or where the electrical grid power is not entirely reliable.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

What is claimed is:

1. A method for extracting geothermal energy from a well in the subsurface of the Earth, comprising:
    using a drill bit and a drill string to drill a well down to and into a hot rock formation, creating an outer annulus between the drill string and a resulting wellbore;
    installing concentric tubing inside the drill string to create an inner annulus and a closed loop fluid flow path;
    injecting a first heat transfer fluid down the outer annulus into the hot rock formation to create a cloud of the first heat transfer fluid within the hot rock formation, wherein no first heat transfer fluid is recovered from the hot rock formation;
    pumping a second heat transfer fluid down the inner annulus into the closed loop fluid flow path and back to the surface through the concentric tubing and
    converting heat collected by the second heat transfer fluid to useable energy.

2. The method of claim 1 wherein the injected first heat transfer fluid is chosen from the group consisting of water, brine, supercritical carbon dioxide, captured flue gases, captured flue gases dissolved in water and captured flue gases dissolved in supercritical carbon dioxide.

3. The method of claim 1 wherein the first heat transfer fluid and the second heat transfer fluid are both supercritical carbon dioxide.

4. The method of claim 1 wherein the well is primed with the first heat transfer fluid to create the cloud of the first heat transfer fluid within the hot rock formation for a predetermined period of time before beginning geothermal heat extraction using the second heat transfer fluid.

5. The method of claim 1 wherein the wellbore section in the hot rock formation is drilled with non-damaging reservoir drilling techniques, further comprising the use of light weight drilling fluid, to avoid formation damage.

6. A method for combining geothermal energy generation and carbon dioxide sequestration in the same well comprising:
    using a drill bit and a drill string to drill a commercially viable geothermal well down to and into a hot rock formation, creating an outer annulus between the drill string and a resulting wellbore;
    installing concentric tubing inside the drill string to create an inner annulus and a closed loop fluid flow path;
    injecting supercritical carbon dioxide down the outer annulus and into the hot rock formation to create a cloud of supercritical carbon dioxide within the hot rock formation;
    pumping a heat transfer fluid down the inner annulus into the closed loop fluid flow path and back to the surface through the concentric tubing;
    converting heat collected by the heat transfer fluid to useable energy;
    collecting data using at least one instrument positioned within the well to assess the amount of carbon dioxide being captured within the hot rock formation and
    increasing the quantity of supercritical carbon dioxide injected into the outer annulus if the amount of carbon dioxide being captured is above a predetermined level thereby sequestering carbon dioxide in commercially significant quantities.

7. The method of claim 6 wherein the well is used for concurrent geothermal energy generation and carbon dioxide sequestration until the amount of geothermal energy produce falls below a predetermined level, and is then for used only for carbon dioxide sequestration.

8. The method of claim 6 wherein the well is used for concurrent geothermal energy generation and carbon dioxide sequestration until it has reached the end of its useful life for carbon dioxide sequestration and is then for used only for geothermal energy generation.

9. The method of claim 6 wherein the well is used only for geothermal energy generation for some predetermined period of time and then is used for concurrent geothermal energy generation and carbon dioxide sequestration.

10. The method of claim 6 wherein the well is used only for geothermal energy generation until the amount of geothermal energy produce falls below a predetermined level and is then used only for carbon dioxide sequestration.

11. The method of claim 6 wherein the well is primed with supercritical carbon dioxide to create a cloud of supercritical carbon dioxide within the hot rock formation for a predetermined period of time before beginning geothermal heat extraction.

12. The method of claim 6 wherein the wellbore section in the hot rock formation is drilled with non-damaging reservoir drilling techniques, further comprising the use of light weight drilling fluid, to avoid formation damage.

13. A method for combining carbon dioxide sequestration and geothermal energy generation in the same well comprising:

using a drill bit and a drill string to drill a commercially viable carbon sequestration well down to and into a hot rock formation, creating an outer annulus between the drill string and a resulting wellbore;

injecting supercritical carbon dioxide through the outer annulus into the hot rock formation to create a cloud of supercritical carbon dioxide within the hot rock formation surrounding the directional section of the wellbore, thereby sequestering the supercritical carbon dioxide;

collecting data using at least one instrument positioned within the well to measure heat flow and either;

where the heat flow rate exceeds a predetermined value, installing concentric tubing inside the drill string to create an inner annulus surrounding the concentric tubing and a closed loop fluid flow path;

pumping a heat transfer fluid down the inner annulus into the closed loop fluid flow path and back to the surface through the concentric tubing and converting heat collected by the heat transfer fluid to useable energy, or where the heat flow rate is below a predetermined value, continuing to use the well only as a carbon sequestration well.

14. The method of claim 13 wherein the well is used for concurrent carbon dioxide sequestration and geothermal energy generation until it has reached the end of its useful life for carbon dioxide sequestration and is then for used only for geothermal energy generation.

15. The method of claim 13 wherein the well is used for concurrent carbon dioxide sequestration and geothermal energy generation until it has reached the end of its useful life for geothermal energy generation and is then for used only for carbon dioxide sequestration.

16. The method of claim 13 wherein the well is used only for carbon dioxide sequestration for some period of time and then is used for concurrent carbon dioxide sequestration and geothermal energy generation.

17. The method of claim 13 wherein the well is used only for carbon dioxide sequestration until it has reached the end of its useful life for carbon dioxide sequestration and is then used only for geothermal energy generation.

18. The method of claim 13 wherein the wellbore section in the hot rock formation is drilled with non-damaging reservoir drilling techniques, further comprising the use of light weight drilling fluid, to avoid formation damage.

* * * * *